United States Patent
Badet et al.

(10) Patent No.: US 9,972,825 B2
(45) Date of Patent: May 15, 2018

(54) METHOD FOR SEALING OFF AN ORIFICE OF A STORAGE CELL CONTAINER AND CONTAINER SEALED OFF BY THIS METHOD

(71) Applicant: SAFT GROUPE SA, Bagnolet (FR)

(72) Inventors: Sebastien Badet, Bruges (FR); Richard Roy, Pessac (FR)

(73) Assignee: SAFT GROUPE SA, Bagnolet (FR)

( * ) Notice: Subject to any disclaimer, the term of this patent is extended or adjusted under 35 U.S.C. 154(b) by 366 days.

(21) Appl. No.: 14/938,452

(22) Filed: Nov. 11, 2015

(65) Prior Publication Data

US 2016/0141595 A1 May 19, 2016

(30) Foreign Application Priority Data

Nov. 14, 2014 (FR) ..................................... 14 61017

(51) Int. Cl.
*H01M 2/36* (2006.01)
*H01M 10/0525* (2010.01)
*F16B 19/00* (2006.01)

(52) U.S. Cl.
CPC ............ *H01M 2/365* (2013.01); *H01M 2/36* (2013.01); *H01M 2/361* (2013.01); *H01M 2/362* (2013.01); *F16B 19/008* (2013.01); *H01M 10/0525* (2013.01)

(58) Field of Classification Search
CPC ........ H01M 2/365; H01M 2/36; H01M 2/361; H01M 2/362; H01M 10/0525
See application file for complete search history.

(56) References Cited

U.S. PATENT DOCUMENTS

2014/0186133 A1 7/2014 Dehlke

FOREIGN PATENT DOCUMENTS

| DE | 11 2011 105667 T5 | 7/2014 |
|---|---|---|
| JP | 2012-009288 A | 1/2012 |
| JP | 2014-120389 A | 6/2014 |
| JP | 2014-130726 A | 7/2014 |

OTHER PUBLICATIONS

Communication dated Mar. 31, 2016 from European Patent Office in counterpart Application No. 15193073.2.
French Search Report for FR 14 61 017 dated Jul. 9, 2015.

*Primary Examiner* — Jane Rhee
(74) *Attorney, Agent, or Firm* — Sughrue Mion, PLLC (57) ABSTRACT

There is provided a method for sealing a filling orifice formed on a wall of a container in a leak-proof manner using a stopper arrangement comprising a tubular member with a flange having an upper face, and a lower face for covering the orifice, and a mandrel with a stem which is housed inside the tubular member, the force necessary for rupturing the stem being greater than the force resulting from the entry and advancement of a head of the mandrel inside the tubular member, comprising introducing the stopper arrangement into the orifice, bringing the nosepiece of the riveting tool into abutment with the upper face of the flange, actuating the riveting tool so as to exert a tensile force on the stem and bring about expansion of the tubular member against the wall of the orifice and rupturing the stem of the stopper arrangement.

20 Claims, 5 Drawing Sheets

METHOD FOR SEALING OFF AN ORIFICE OF A STORAGE CELL CONTAINER AND CONTAINER SEALED OFF BY THIS METHOD

BACKGROUND OF THE INVENTION

The invention relates to the field of sealed storage cells, particularly to the field of lithium-ion type storage cells.

The present invention relates to a method for sealing in a leak-proof manner an electrolyte filling orifice provided on a cell container wall by the use of a stopper arrangement. The invention also relates to a cell container with a filling orifice that is sealed off by this method.

A sealed storage cell or sealed electrochemical cell (these two terms being equivalent) comprises in a known manner a container accommodating an electrode plate group, which electrode plate group comprises an alternation of positive and negative electrodes flanking separators. The electrode plate group is impregnated with electrolyte. Each electrode is composed of a metal current collector carrying an electrochemically active material on at least one of its faces. The electrode is electrically connected to a power output terminal which ensures electrical continuity between the electrode and an external application with which the storage cell is associated. The electrode plate group is disposed inside the container, closed in a leak-proof manner by a cover. During manufacture of the container, provision is generally made to fill the latter with electrolyte through an orifice provided in the container wall. After filling, it is necessary to seal off this orifice in leak-proof manner.

Indeed, one of the container's functions is to prevent all leakage of electrolyte or material that might escape from the storage cell which thus could spread to the area around the cell. The electrolyte may be acid in the case of lead-acid storage cells or be a strong base such as KOH, LiOH or NaOH in the case of alkaline storage cells. This will be an organic solvent in the case of a Li-Ion cell. In order to avoid the space surrounding the cell becoming contaminated, it is therefore necessary for the container to be liquid-tight and that the electrolyte filling orifice be fully closed.

PRIOR ART

A sealing assembly for sealingly mounting a cell terminal is known from document CN102299273. This assembly includes a cable gland of the screw-nut type (and not a rivet) for securing said assembly onto the cell cover. However the risk of disassembly occurring is detrimental to the reliability of the seal.

Another seal assembly for sealing a cell terminal is known from EP685895. This assembly comprises a hollow rivet which secures a said assembly on the cell cover. A seal in turn ensures sealing between the rivet and the cover. The assembly also comprises a safety valve which closes a radial orifice and which is held in place by the cap of the terminal, the cap being welded to the head of the hollow rivet. In this case, sealing the orifice formed in the storage cell lid requires the use of at least two parts in addition to the rivet, more precisely the valve and the cap. Furthermore, securing of the sealing means is performed by a welding operation. As a consequence, this assembly involves a significant number of parts and assembly operations.

U.S. Pat. No. 4,215,187 discloses sealing carried out at a cell container wall by means of a rivet head in conjunction with a sealing ring which surrounds it. This sealing system, however, requires an extra part in addition to the rivet, in other words the sealing ring. In addition, this type of part is usually subject to wear and suffers aging more rapidly than the cell itself.

U.S. Pat. No. 4,006,282 discloses a sealing device for the current output terminals of a lead-acid storage cell also requiring in addition to the rivet, a part to ensure tightness.

In order to overcome all or part of the disadvantages mentioned above, the invention discloses a method for sealing off the orifice of a container wall reliably and simply, while limiting the number of parts and steps.

SUMMARY OF THE INVENTION

To this end the invention provides a method for sealing in a leak-proof manner a filling orifice formed on a wall of a container using a stopper arrangement, said stopper arrangement comprising:

a tubular member, said tubular member being provided at one of its ends with a flange having an upper face adapted to receive a nosepiece of a riveting tool and a lower face adapted to cover the orifice, and a mandrel provided with a stem terminating with a head, the stem being housed inside the tubular member and the head being located at one end of the mandrel, opposite the flange, said mandrel head having a cross section that is comprised between the inside cross section and the outer cross section of the tubular member, the material constituting the stem having a hardness that is equal to or greater than three times the hardness of the material constituting the tubular member and the material constituting the container wall having a hardness greater than or equal to 1.3 times that of the tubular member, said method comprising the steps of:

introducing the stopper arrangement into the orifice, the cross section of the orifice being greater than the outer cross section of the tubular member so as to intentionally define a gap between the wall of the orifice and the outer wall of the tubular member, bringing the nosepiece of the riveting tool into abutment with the upper face of the flange of the stopper arrangement, actuating the riveting tool so as to exert a tensile force on the stem of the mandrel, the nosepiece of the riveting tool maintaining the tubular member in the orifice, to thereby:

bring about expansion of the tubular member against the wall of the orifice by the entrance and advance of the head of the mandrel inside the tubular member and, close the gap between the wall of the orifice and the outer wall of the tubular member by the advance and maintenance of the head of the mandrel inside the tubular member at the wall of the container.

Preferred features of the invention, whether complementary or alternative, are set out below.

The method may include an additional step of rupturing the stem of the stopper arrangement, after having at least positioned the nosepiece of the riveting tool in abutment with the upper face of the flange of the stopper arrangement, the force necessary for rupturing the stem being greater than the force resulting from the entry and advancement of the head of the mandrel inside the tubular member and the cross section of the riveting tool being smaller than the cross section of the mandrel head.

The gap prior to expansion of the tubular member corresponds to the difference between the diameter of the orifice and the outside diameter of the tubular member and can be greater than 0.05 mm.

The stem can comprise a region of weakness of smaller cross section than the average cross section of the stem, so that the fracture of the stem occurs at said weakened region for tensile forces less than $R_{m41}*s41'$, in which s41' corresponds to the cross section of the stem after fracture under tensile stress and $R_{m41}$ is the ultimate tensile strength of the stem.

The stem can be made of steel, while the tubular member can be of aluminum alloy, preferably "1000 Series" aluminum alloy.

The tubular member can be sealed at its end opposite the flange by a cover.

The head of the mandrel can extend along a length comprised between 80% and 150% of the sum of the thickness of the container wall and the thickness of the flange.

The face of the nosepiece of the riveting tool and the surface of the flange of the stopper arrangement can be planar.

The face of the nosepiece of the riveting tool can comprises a projection of a shape that is complementary to that of a recess formed on the upper face of the flange of the stopper arrangement.

The container wall can have a thickness of between 1 and 3 mm and preferably between 1.8 and 2.5 mm.

The container can be of aluminum.

The cross sections of respectively the tubular member, of the stem, of the head of the mandrel and of the orifice can be elliptical.

The cross sections of respectively the tubular member, of the stem, of the head, of the mandrel and of the orifice can also be circular.

The diameter of the orifice can be between 3.25 and 3.7 mm.

The wall of the container can be a cover of a storage cell container, the filling orifice being an electrolyte filling orifice.

The storage cell can be a lithium-ion type cell.

The stopper arrangement and the container can satisfy the following relationships:

$$s_{41} < s_{30int} < s_{42} < s_{30ext} < s_{12}$$

$$s_{42} - s_{41} > s_{12} - s_{30ext}$$

$$R_{m41}*s_{41'} > 7*R_{m30}*e*(s_{42}-s_{41}+s_{30ext}-s_{12})/2 + 0.9 R_{m30}*(s_{30ext}-s_{41})$$

in which: $s_{41}$, $s_{41'}$, $s_{30int}$, $s_{42}$, $s_{30ext}$, $s_{12}$ are respectively the cross sections of the stem prior to and after fracture under tensile stress, of the tubular member (inside cross section) of the mandrel head, of the tubular member (outside cross section), of the orifice, and e is the thickness of the container, $R_{m30}$ and $R_{m41}$ being ultimate tensile strengths.

The stopper arrangement may consist only of the tubular member and the mandrel.

The invention also relates to a cell container with an electrolyte filling orifice, characterized in that the filling orifice is sealed off in a leak-proof manner vis-a-vis liquids and gases by means of a method according to any one of the embodiments of the invention.

Other features and advantages of the present invention will become apparent on reading the description which follows based on non-limiting exemplary embodiments, and with reference to the accompanying drawings.

BRIEF DESCRIPTION OF THE DRAWINGS

For reasons of clarity, the dimensions of the components shown in these drawings are not necessarily proportional to their actual dimensions. Identical references in the drawings correspond to the same parts shown.

DETAILED DESCRIPTION OF EMBODIMENTS

Figure 1:
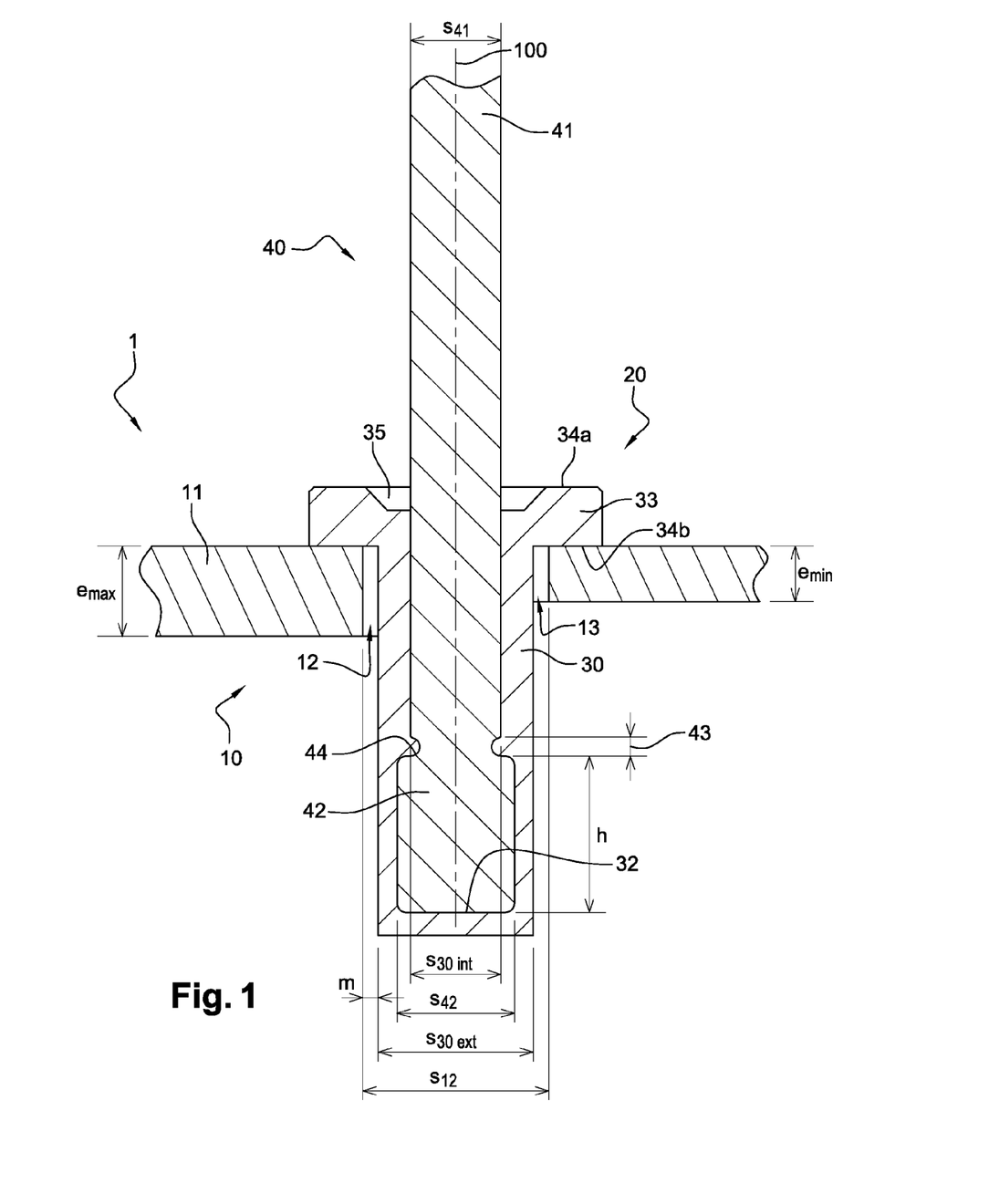
FIG. 1 shows diagrammatically a cross section of a battery cell container with an electrolyte filling orifice, this view corresponding to the first step of the sealing method, according to an embodiment of the invention.
Figure 2:
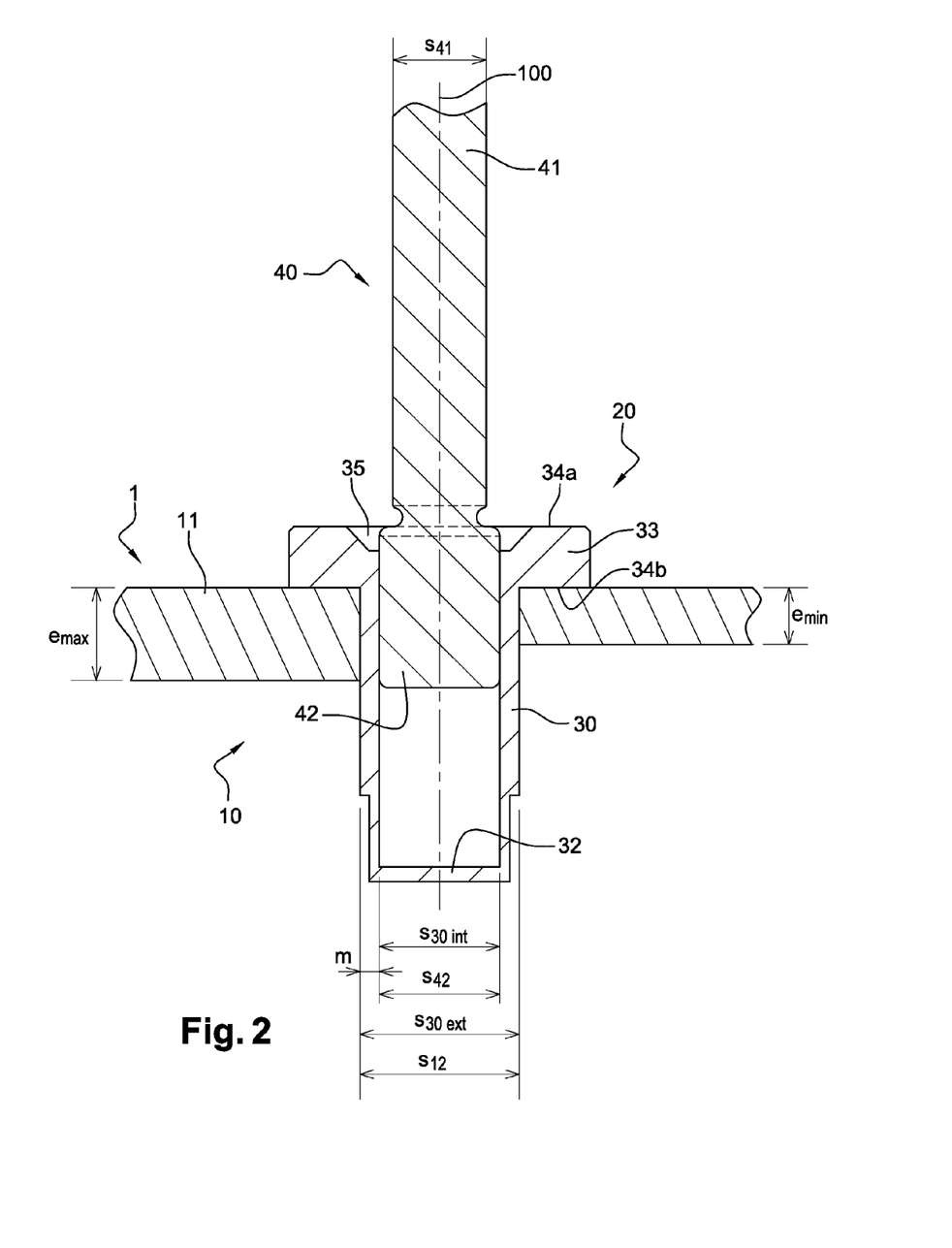
FIG. 2 shows diagrammatically a cross section of a cell container with an electrolyte filling orifice, this view corresponding to the end of the last step of the sealing method according to an embodiment of the invention.

In FIGS. 1 and 2, a longitudinal section is shown along axis 100 of a wall 11 of a container 1, said wall including an orifice 12 of cross section $s_{12}$. This orifice allows filling of the container 1.

Both in FIG. 1 and FIG. 2, the orifice receives a stopper arrangement 20 comprising a tubular member 30 extending along longitudinal axis 100, of nominal outside cross section $s30_{ext}$ and nominal inside cross section $s30_{int}$. The term "nominal outside cross section" means the average cross section of the tubular member defined by the outer contour of the tubular member, viewed in a transverse section passing through a plane perpendicular to longitudinal axis 100. The term "nominal inside cross section" means the average section of the tubular member defined by the inside contour of the tubular member, viewed in a transverse section passing through a plane perpendicular to longitudinal axis 100. The tubular member is provided at one of its ends with a flange 33 whose lower face 34b is adapted to cover the orifice and the upper face 34a of which is adapted to receive the nosepiece 50 of a riveting tool. The term "adapted to cover the orifice" means that the lower face 34b of the flange largely bears against the outer surface of the container wall. The term "adapted to receive the nosepiece of a riveting tool", means that the outer face 34a of the flange is able to cooperate in frontal contact with a riveting tool nosepiece.

In FIG. 1, the stopper arrangement is shown in longitudinal section positioned inside the orifice prior to having implemented the method for sealingly closing the container. The cross section of the orifice 12 is greater than the nominal outside diameter $s30_{ext}$ of the tubular member 30 so as to define an intentional gap or clearance m between the wall of the orifice 12 and the outer wall of tubular member 30. The stopper arrangement includes a mandrel 40 consisting of a stem 41 terminated at one of its ends by a head 42. The mandrel is housed inside the tubular member, so that the mandrel head is located at the opposite end of the tubular member to the flange and so that the stem thereof extends externally of the tubular member at the flange end.

According to a first embodiment not shown in FIG. 1 the mandrel head may extend completely or at least partially externally of the tubular member.

In a second embodiment shown in FIG. 1, the head of the mandrel can be accommodated inside the tubular member.

In all cases, the cross section $s_{42}$ of the head is less than the nominal outer cross section $s30_{ext}$ of the tubular member, so as to allow the head to advance inside the tubular member. Similarly, the cross section $s_{42}$ of the head is greater than the nominal inside cross section $s30_{int}$ of the tubular member, so that the advancement of the head inside the tubular member causes it to expand. The cross section $s_{41}$ of the stem is less than the nominal inside diameter of the tubular member.

Relations between the cross sections can be stated as follows: $s41 < s30_{int} < s_{42} < s30_{ext} < s_{12}$.

In FIG. 2, there is shown in longitudinal section the wall of the container of FIG. 1 and its stopper arrangement still positioned inside the orifice, but after having implemented the sealing method. The head 42 of the mandrel has advanced inside the tubular member until it reaches a position at the level of orifice 12 and to bring about expansion of the tubular member. The clearance m defined between the wall of the orifice and the outer peripheral surface 13 of the stopper arrangement has now become filled.

The sealing method according to the invention comprises the steps of:
- introducing the stopper arrangement 20 into the orifice 12,
- positioning the nosepiece of a riveting tool 50 against the upper face 34a of the flange 33 of the stopper arrangement 20,
- actuating the riveting tool so as to exert a pull on the stem 41 of the mandrel 40.

Figure 4:
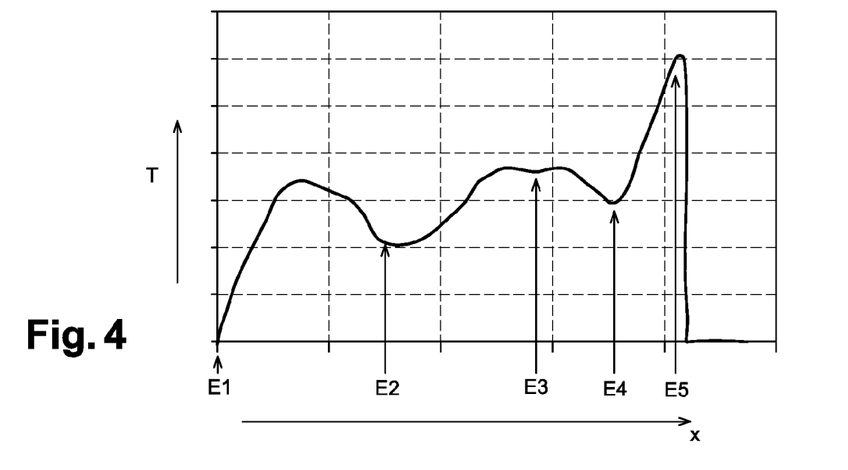
FIGS. 4 to 8 are plots corresponding to test results.

FIG. 4 shows a plot of forces T applied to the stem during the different method steps. The path running from position E1 up to position E2 corresponds to the insertion of the mandrel head inside the tubular member, in other words the insertion of the mandrel head into the nominal cross section $s30_{int}$ of the tubular member. The path from position E2 to the position E4 corresponds to the advancement of the mandrel head inside the tubular member with the curve reaching a peak E3 corresponding to the maximum insertion force of the mandrel head into the thickness of wall 11. At position E4, the mandrel head comes to abut against the nosepiece of the riveting tool and the force continues to increase up until fracture of the stem at E5.

Figure 3A:
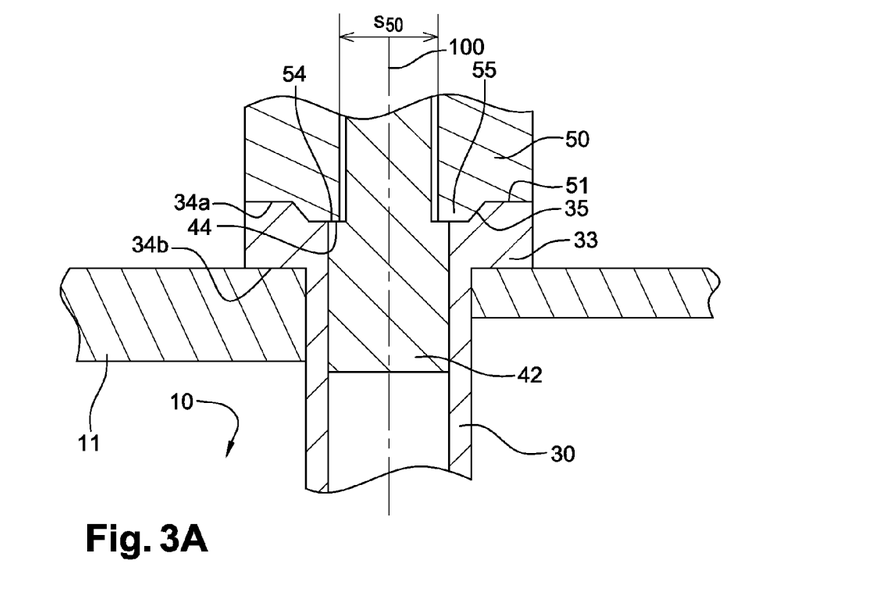
FIG. 3A shows diagrammatically a cross section of a cell container with an electrolyte filling orifice, this view corresponding to the end of the last step of the sealing method, according to a certain embodiment of the invention.
Figure 3B:
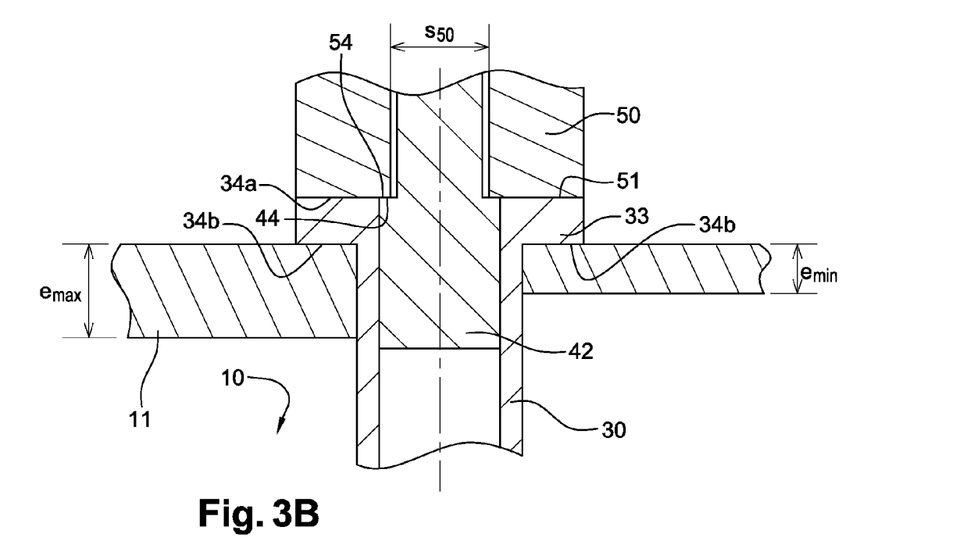
FIG. 3B shows diagrammatically a cross section of a cell container with an electrolyte filling orifice, this view corresponding to the end of the last step of the sealing method according to another embodiment of the invention.

As shown in FIGS. 3A and 3B, the nosepiece 50 of the riveting tool holds the flange against the outer wall of container tubular member 30.

According to one embodiment shown in FIG. 3B, the face 51 of the nosepiece 50 of the riveting tool and the outer face 34a of the flange 33 are planar, so that bringing the two surfaces into contact is easy.

According to another embodiment shown in FIG. 3A, the face 51 of the nosepiece 50 of the riveting tool comprises a projection 55 of complementary shape to that of a recess 35 formed in flange 33. In this way, displacement along an axis perpendicular to the longitudinal axis 100 of the nosepiece of the riveting tool relative to the flange is locked. This complementarity of shape makes it easy to not only bring the two surfaces into contact, but also to maintain said contact and ensure that stem 41 after it has fractured, cannot go beyond a certain point as regards face 34a, thereby protecting the stopper arrangement from potential impact.

The pulling force exercised by the riveting tool on the stem brings about, first, entry of the mandrel head into that section of the tubular member corresponding to its inside cross section $s30_{int}$. Then, advance of the mandrel head inside the tubular member brings about expansion of the tubular member against the wall of the orifice. Therefore, the clearance or gap m between the wall of orifice 12 and the outer wall of tubular member 30 disappears. The term "expansion" means here the step of expanding the tubular member by plastic deformation. In the case of a circular section tubular member, the tubular member outside diameter is enlarged just like the internal diameter while the thickness of the tubular member decreases.

To ensure the outer surface of the tubular member remains firmly pressed against the wall of the orifice without allowing even the slightest clearance, the advancement of head 42 of the mandrel inside the tubular member comes to an end when said head is located at the container wall. In this way, the mandrel head maintains sealing at the contact between the wall of the orifice and the tubular member and closes off the inside of the tubular member in order to prevent any possibility of communication between the inside of the container and the outside. Advance of head 42 of the mandrel ends when the mandrel head comes into abutment with the nosepiece of the riveting tool. More specifically, the cross section $s_{42}$ of the mandrel head is greater than the cross section $s_{41}$ of the stem so as to form a shoulder 44 against which a portion 54 of the nosepiece of the riveting tool abuts. Similarly, the cross section $s_{50}$ of the nosepiece of the riveting tool is smaller than the cross section $s_{42}$ of the mandrel head.

In order for the mandrel head to reach the level of the wall of the container, it is essential that the stem does not break under tensile stress.

Therefore, the material constituting stem 41 has a hardness greater than or equal to three times the hardness of the material forming tubular member 30 and the material constituting the container wall has a hardness greater than or equal to 1.3 times that of tubular member 30. The following table lists a number of possible alloys for the tubular member and the container:

|  | Brinell hardness HB |
|---|---|
| Aluminum wall 1100-H14 | 32 |
| Aluminum tubular member 1100-O | 23 |
| Steel mandrel | 165 |
| Aluminum mandrel 7075 T651 T62 | 160 |
| Stainless steel mandrel | 80 |

In addition, the tests discussed below have established that the gap or clearance m between the wall of the orifice 12 and the outer wall of the tubular member 30 prior to expansion is preferably greater than 0.025 mm.

Indeed, to allow filling of this space m between the tubular member and the wall of the orifice, it is necessary to have a clamping radius, S, which is strictly greater than zero. Clamping radius corresponds to the difference between the clearance of the stopper arrangement relative to the wall and the increase in diameter of the tubular member during expansion, this increase being due to the difference in diameter between the inside diameter of the tubular member and the diameter of the mandrel head. In the case where the stopper arrangement and the orifice have circular cross sections, we obtain the following condition:

$$(\varnothing_{tubular\ member\ OD} + (\varnothing_{mandrel\ head} - \varnothing_{tubular\ member\ ID}) - \varnothing_{orifice})/2 > 0$$

To ensure adequate sealing, without causing too high a deformation and stress in the stopper arrangement, the clamping radius must preferably be between 0.05 mm and 0.4 mm.

This implies a minimum gap or clearance m of 0.025 mm which corresponds to a minimum clearance equal to the diameter prior to expansion $\varnothing_{orifice} - \varnothing_{tubular\ member\text{-}OD} = 0.05$ mm. $\varnothing_{tubular\ member\text{-}OD}$ refers to the outside diameter of the tubular member and $\varnothing_{tubular\ member\text{-}ID}$ refers to the inside diameter of the tubular member.

For a tubular member of outside diameter $\varnothing_{tubular\ member\text{-}OD}$ of 3.2 mm, the range of orifice diameters that can be used is between 3.25 and 3.7 mm in other words +1.5% to +15% relative to the outside diameter of the tubular member. In this case, the stem can have a diameter of 1.8 mm and the mandrel head, a diameter of 2.4 mm.

To ensure insertion of the mandrel head into the thickness of the tubular member without the stem rupturing prematurely, the following relationship (A) that the stopper arrangement and the container should comply with was established empirically:

$$R_{m41}*s_{41'} > 7*R_{m30}*e*(s_{42}-s_{41}+s_{30ext}-s_{12})/2+0.9R_{m30}*(s_{30ext}-s_{41})$$

in which:
s41, s41', s30$_{int}$, s42, s30$_{ext}$, s12 are respectively the cross sections of the stem prior to and after fracture under tensile stress, of the inner tubular member, of the mandrel head, of the outer tubular member and of the orifice,
e is the thickness of the container,
$R_{M30}$ and $RM_{41}$ are the ultimate tensile strengths of respectively the tubular member and the stem.

To establish this relationship, it was considered that:

$$R_{m41}*s_{41'} > 7*R_{m30}*e*\text{clamping radius } S + \text{no-load crimping force, given that the no-load crimping force is equal to } 0.9 R_{m30}*(s_{30ext}-s_{41}).$$

The coefficients 7 and 0.9 were established empirically using tensile tests, taking into account friction between the mandrel head and the tubular member, the latter being considered as equivalent to friction between steel and aluminum. The tensile testing machine was operated at a speed of 10 mm/min.

To be conservative, the tensile strength of the tubular member was considered by assuming that the law governing build-up of stress as a function of plastic deformation of the tubular member is a constant equal to ultimate tensile strength.

A coefficient of 1.2 as a minimum can be added to the estimate of ultimate tensile strength in order to compensate for a 20% variation in the mechanical characteristics of the components.

The empirical relationship that the stopper arrangement and the container should comply with has been validated using, among other things, the tests discussed below and illustrated in FIGS. 5 to 8.

Figure 5:
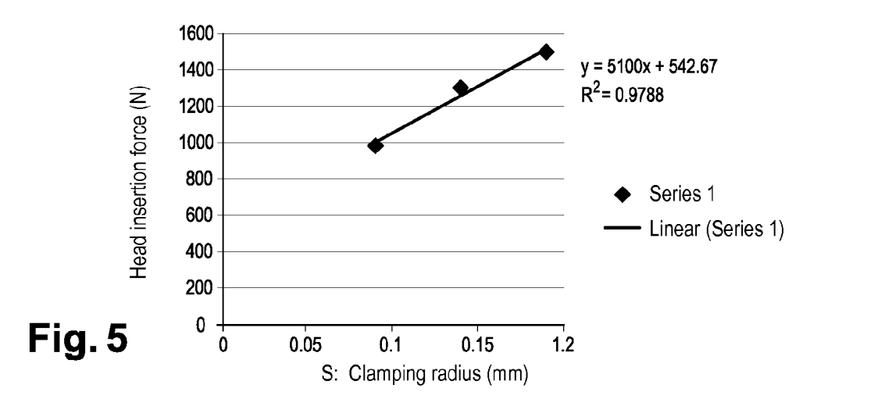

In FIG. 5, there is shown a plot of increase in the force for inserting the head of the mandrel as a function of clamping radius S. The tests were carried out at a pulling rate of 10 mm/min on a tubular member of grade 1100 aluminum in the annealed condition, the stem being made of steel and the container being of aluminum with a thickness of 1.8 mm and an orifice diameter of 3.4 mm. The diameter of the mandrel head is the variable, this allowing the value of clamping to be varied. FIG. 5 shows the linearity between clamping radius S and the force of insertion of the mandrel head, the y-axis value at the origin corresponding to the no-load insertion force.

Figure 6:
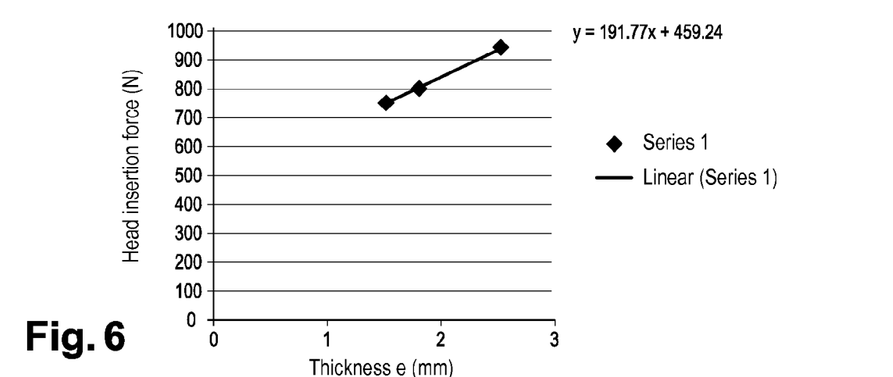

FIG. 6 shows variation in force for inserting the head of the mandrel as a function of thickness e of the container. The tests were carried out with a tubular member of grade 1100 aluminum in the annealed condition and with a degree of clamping of 0.19 mm. FIG. 6 shows the linearity between thickness of the cover and the force for inserting the mandrel head, the y-axis value at the origin corresponding to the no-load insertion force.

Figure 7:
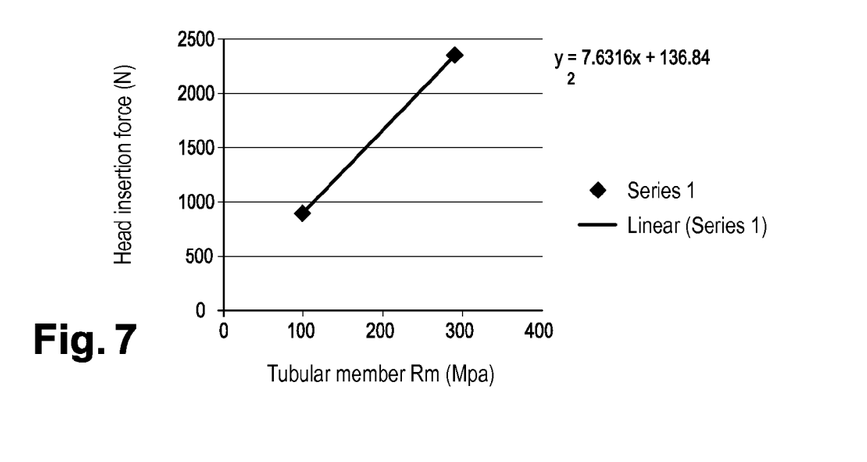

FIG. 7 shows variation in insertion force as a function of the ultimate tensile strength $RM_{30}$ of the tubular member $RM_{30}$. The tests were performed with a 1.8 mm cover thickness e and a degree of clamping of 0.19 mm. Two tubular members were tested, one in grade 1100 aluminum in the annealed condition with an ultimate tensile strength estimated to be 100 MPa and the other in grade 5056 aluminum in the annealed condition with an estimated ultimate tensile strength of 290 MPa. FIG. 7 shows a low y-axis value at the origin where an approximation using a linear curve is employed, which corresponds to the relation established empirically between the stopper member and the container.

Figure 8:
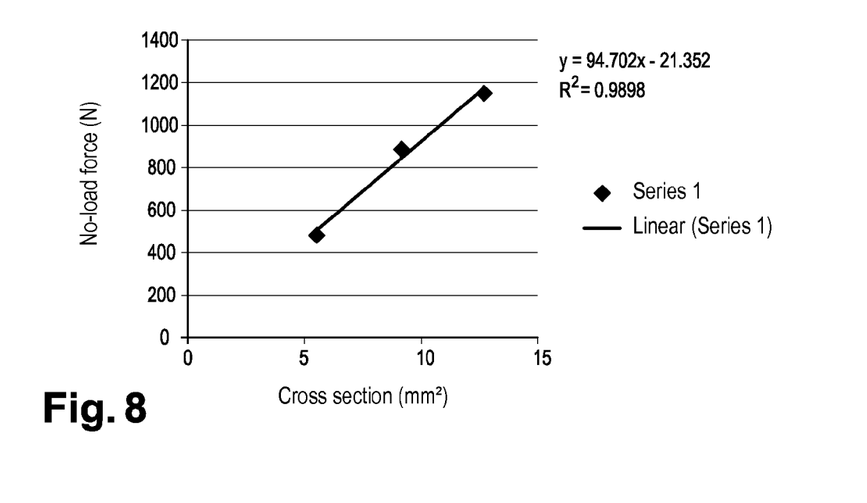

FIG. 8 shows variation of no-load expansion force as a function of tubular member thickness. Tests were performed on three tubular members in grade 1010 aluminum in the annealed and expanded state in the absence of clamping force, the tubular members having different tube and stem diameters.

|  | Samples | | |
|---|---|---|---|
|  | 1 | 2 | 3 |
| Ø tube | 3.2 mm | 4 | 4.8 mm |
| Ø stem | 1.8 mm | 2.1 | 2.65 mm |
| Section between Ø tube and Ø stem | 5.5 mm$^2$ | 9.1 mm$^2$ | 12.6 mm$^2$ |

FIG. 8 shows the linearity between thickness of the tubular member and no-load expansion force.

The empirical relationship (A) that the stopper arrangement and the container should comply with was also verified using a tubular member made of grade 1100 aluminum in the annealed state (Rm=100 MPa), a 3.35 mm diameter orifice, a stem cross section of 1.23 mm$^2$, equivalent to a diameter reduced to 1.25 mm, a 1.8 mm container thickness and a clamping radius S of 0.225 mm.

The total insertion force of the mandrel head into the thickness of the cover is estimated to be 7×100×1.8×0.225+ 0.9×100×(π×3.2$^2$/4−π×1.8$^2$/4)=778 N including a no-load force of 495 N.

The material of the stem will therefore be chosen with an ultimate tensile strength of a minimum of 635 MPa in order to obtain an estimated stem breakage force of at least 635 MPa×1.23 mm$^2$=780 N, a force which is greater than the stem head insertion force.

With the addition of the 20% margin, the rupturing force to be guaranteed is 934 N, giving a choice of materials with an ultimate tensile strength of 934/1.23=760 MPa.

Tests were carried out under these conditions, the error in the empirical relationship (A) is estimated to be:

|  | Configuration | Force | Test | Estimation relation A | Error |
|---|---|---|---|---|---|
| 1 | E$_{container}$ 1.8 mm | No-load | 480 N | 495 N | 3% |
|  | Rm$_{stopper\ member\ body}$ = 100 Mpa for 1100 annealed Al | Complete insertion of stem head into thickness of container | 777 N | 778 N | 0.1% |
|  | Clamping radius S = 0.225 |  |  |  |  |
|  | Ø stopper member = 3.2 |  |  |  |  |
|  | Østem = 1.8 |  |  |  |  |

-continued

| | Configuration | Force | Test | Estimation relation A | Error |
|---|---|---|---|---|---|
| 2 | $E_{container}$ 1.8 mm $Rm_{stopper\ member\ body}$ = 290 Mpa for 5056 annealed Al Clamping radius S = 0.29 Østopper member = 3.2 Østem = 1.8 | No-load Complete insertion of stem head into thickness of container | 1392 N 2270 N | 1434 N 2495 N | 3% 10% |

Advantageously, the method comprises an additional step of rupturing the stem 41 of the stopper arrangement 20, after having at least positioned in abutment the nosepiece 51 of the riveting tool against the upper face 34a of the flange 33 of the stopper arrangement 20. The rupturing strength of the stem is greater than the force resulting from the entry and advancement of the head 42 of the mandrel into the tubular member.

To prevent any part of the broken stem forming an extension of the stopper arrangement which would constitute a prejudicial asperity on the surface of the container, it is advantageous to break the stem at the most immediate vicinity to the mandrel head.

For this purpose, the stem may advantageously comprise a region of weakness 43 the cross section of which is smaller than the average cross section of the stem, so that the fracture of the stem 41 occurs at this region of weakness 43, for tensile stresses less than $R_{m41}*s_{41'}$.

in which:
$s_{41'}$ is the cross section of the stem after fracture under tensile stress
$R_{m41}$ is the ultimate tensile strength of the stem The invention advantageously finds application in conjunction with storage cells of for example the lithium-ion type. The material constituting the container is for example a conventional grade of aluminum and the wall of the container to be sealed is a lid with a filling orifice for electrolyte. This filling orifice is then sealed off vis-a-vis liquids and gases.

Preferably, the lid has a thickness e which is comprised between $e_{min}$ equal to 1 and $e_{max}$ equal to 3 mm and preferably a thickness e comprised between $e_{min}$ equal to 1.8 and $e_{max}$ equal 2.5 mm.

Advantageously, the respective cross sections of the tubular member 30, of the stem 41, of the head 42 of the mandrel 40 and the orifice 12 are elliptical.

More preferably, the respective cross sections of the tubular member 30, of the stem 41, of the head 42, of the mandrel 40 and the aperture 12 are circular.

Advantageously, the diameter of the orifice 12 is between 3.25 mm and 3.7 mm.

In order to be electrochemically compatible with the electrolyte and so as to be sufficiently ductile, the tubular member 30 is preferably made of "1000 Series" aluminum alloy. "1000 Series" aluminum alloy means annealed grades of aluminum that do not contain any added elements. They are distinguished by a greater or a lesser presence of impurities. Usually, the third number indicates purity by giving the value of the first decimal place to be added to 99% (example: 1050 alloy contains 99.5% aluminum).

As stem 41 needs to have greater hardness than that of the tubular member, it is preferably made of steel. Obviously, the stem could be made of any material having a tensile strength between 600 and 1000 MPa.

To prevent the mandrel head being in contact with the electrolyte, the tubular member 30 is preferably sealed at its end opposite to flange 33 by a cover 32. Other alternatives may also be envisaged such as those which consist in coating the head of the mandrel with a film which is electrochemically compatible with the electrolyte.

Preferably, the head 42 of the mandrel 40 extends along a length which is between 80% and 150% of the sum of the thickness of the container wall 1 and the thickness of the flange 33. In this way, it can be guaranteed that the tubular member will be sufficiently forced against the wall of the orifice following longitudinal axis 100.

Sealing tests were conducted on 30 aluminum alloy container lids, 20 of which had a thickness of 1.8 mm and the remaining 10 having a thickness of 2.5 mm. For each of the 30 lids, the same stopper arrangement was used, the latter having a series 1000 aluminum tubular member in order to ensure sufficient compatibility with the electrolyte at the operating voltage of the positive electrode of the storage cell, and deformation upon expansion.

Preferably, the electrolyte is a non-aqueous liquid electrolyte comprising a lithium salt dissolved in a solvent.

The lithium salt is selected from lithium perchlorate $LiClO_4$, lithium hexafluorophosphate $LiPF_6$, lithium tetrafluoroborate $LiBF_4$, lithium trifluoromethanesulfonate $LiCF_3SO_3$, lithium bis(fluorosulfonyl)imide $Li(FSO_2)_2N$ (LiFSI), lithium trifluoromethanesulfonimide LiN $(CF_3SO_2)_2$ (LiTFSI), lithium trifluoromethanesulfonemethide $LiC(CF_3SO_2)_3$ (LiTFSM), lithium bisperfluoroethylsulfonimide $LiN(C_2F_5SO_2)_2$ (LiBETI), lithium 4,5-dicyano-2-(trifluoromethyl) imidazolide (LiTDI), lithium bis (oxalatoborate) (LiBOB), lithium tris(pentafluoroethyl) trifluorophosphate $LiPF_3(CF_2CF_3)_3$ (LiFAP) and mixtures thereof.

Preferably the solvent is a solvent or solvent mixture selected from the usual organic solvents notably saturated cyclic carbonates, unsaturated cyclic carbonates, non-cyclic carbonates, alkyl esters, such as formates, acetates, propionates or butyrates, ethers, lactones such as gamma-butyrolactone, tetrahydrothiofene dioxide, nitrile solvents, and mixtures of the latter. Of the saturated cyclic carbonates, we can mention for example, ethylene carbonate (EC), fluoroethylene carbonate (FEC), propylene carbonate (PC), butylene carbonate (BC), and mixtures of the above. From the unsaturated cyclic carbonates, we can mention for example, vinylene carbonate (VC), its derivatives and mixtures thereof. Among non-cyclic carbonates, we can mention for example dimethyl carbonate (DMC), diethyl carbonate (DEC), ethyl methyl carbonate (EMC), dipropyl carbonate (DPC) and mixtures thereof. Among the alkyl esters we can mention for example methyl acetate, ethyl acetate, methyl propionate, ethyl propionate, butyl propionate, methyl butyrate, ethyl butyrate, propyl butyrate, and mixtures thereof. From the ethers, we can mention for example dimethyl ether (DME) or diethyl ether (DEE), and mixtures thereof.

The electrochemically active material may be any electrochemically active material suitable for a positive electrode of a lithium-ion electrochemical cell. The following electrochemically active materials are particularly suitable for carrying out the invention:

A compound i) of formula $Li_xMn_{1-y-z}M'_yM''_zPO_4$ (LMP) in which M' and M" are chosen from the group comprising B, Mg, Al, Si, Ca, Ti, V, Cr, Fe, Co, Ni, Cu, Zn, Y, Zr, Nb and Mo; M' and M" being different one from another; and $0.8 \le x \le 1.2$; $0 \le y \le 0.6$; $0 \le z \le 0.2$. $LiMnPO_4$ is one example of this compound.

A compound ii) of formula $Li_xM_{1-x-y-z-w}M'_yM''_zM'''_wO_2$ (LMO2) in which M, M', M" and M''' are chosen from the group comprising B, Mg, Al, Si, Ca, Ti, V, Cr, Mn, Fe, Co, Ni, Cu, Zn, Y, Zr, Nb, W and Mo provided that M or M' or M" or M''' is chosen from Mn, Co, Ni, or Fe; M, M', M" and M''' being different one from another; and $0.8 \le x \le 1.4$; $0 \le y \le 0.5$; $0 \le z \le 0.5$; $0 \le w \le 0.2$ and $x+y+z+w<2.2$. Examples of this compound are $LiNi_{1/3}Co_{1/3}Mn_{1/3}O_2$, $LiNi_{0.8}Co_{0.15}Al_{0.05}O_2$, $LiNi_{0.3}Mn_{0.5}Co_{0.15}Al_{0.05}O_2$ and $Li_{1.4}Mn_{0.4}Ni_{0.1}Co_{0.1}O_2$ in which Co, Ni and Mn can be partially substituted with one or more transition metals.

A compound iii) of formula $Li_xMn_{2-y-z}M'_yM''_zO_4$(LMO) in which M' and M" are chosen from the group comprising B, Mg, Al, Si, Ca, Ti, V, Cr, Fe, Co, Ni, Cu, Zn, Y, Zr, Nb and Mo; M' and M" being different one from another; and $1 \le x \le 1.4$; $0 \le y \le 0.6$; $0 \le z \le 0.2$. An example of this compound is the spinel $LiMn_2O_4$.

A compound iv) de formula $Li_xFe_{1-y}M_yPO_4$ (LFMP) in which M is chosen from the group comprising B, Mg, Al, Si, Ca, Ti, V, Cr, Mn, Co, Ni, Cu, Zn, Y, Zr, Nb and Mo; and $0.8 \le x \le 1.2$; $0 \le y \le 0.6$. An example of this compound is $LiFePO_4$.

A compound v) of formula $xLi_2MnO_3$; $(1-x)LiMO_2$ in which M is chosen from the group comprising B, Mg, Al, Si, Ca, Ti, V, Cr, Mn, Co, Ni, Cu, Zn, Y, Zr, Nb and Mo and $x \le 1$. An example of this compound is $Li_2MnO_3$.

A compound vi) of formula $Li_{a+y}(M^1_{(1-t)}Mo_t)_2M^2_b(O_{1-x}F_{2x})_c$ in which:

$M^1$ is chosen from the group comprising Ni, Mn, Co, Fe, V or a mixture thereof;
$M^2$ is chosen from the group comprising B, Al, Si, P, Ti and Mo;
in which
$4 \le a \le 6$;
$0 < b \le 1.8$;
$3.8 \le c \le 14$;
$0 \le x < 1$;
$-0.5 \le y \le 0.5$;
$0 \le t \le 0.9$;
$b/a < 0.45$;
the coefficient c satisfying one of the following relationships:

$$c=4+y/2+z+2t+1.5b \text{ if } M^2 \text{ is selected from B and Al};$$

$$c=4+y/2+z+2t+2b \text{ if } M^2 \text{ is selected from Si, Ti and Mo};$$

$$c=4+y/2+z+2t+2.5b \text{ if } M^2 \text{ is P};$$

with $z=0$ if $M^1$ is selected from Ni, Mn, Co and Fe; and $z=1$ if $M^1$ is V. Examples of this type of compound are given in FR-A-2972442.

a compound vii) de formula $Li_{4+x}MnM^1_aM^2_bO_c$ in which:
M1 is selected from the group consisting of Ni, Mn, Co, Fe, and a mixture thereof;
M2 is selected from the group consisting of Si, Ti, Mo, B, Al and a mixture thereof;
with:
$-1.2 \le x \le 3$;
$0 < a \le 2.5$;
$0 \le b \le 1.5$;
$4.3 \le c \le 10$; et
$c=4+a+n \cdot b+x/2$
in which
$n=2$ when $M^2$ is selected from the group consisting of Si, Ti, Mo or a mixture thereof; and
$n=1.5$ when M2 is selected from the group consisting of B, Al or a mixture thereof.

Examples of this type of compound are given in French patent application FR 11/51899.

Among the electrochemically active materials mentioned above, the following compounds are preferred:

the compound v) having either the formula $Li_{1+x}M_{1-x}O_2$ wherein M represents at least one element selected from Ni, Co and Mn with $0.1<x<0.4$, or the formula $LiNi_{1-x}M1_xO_2$ wherein M1 represents at least one element selected from Co, Mn and Al and $x \le 0.66$. This compound can achieve high energy densities per unit mass.

the compound iv) of formula $LiFe_xMn_{1-x}PO_4$ with $0<x<0.5$. This type of compound has a specific energy 15% higher than that of $LiFePO_4$. This energy is obtained thanks to a higher operating potential than that of $LiFePO_4$. $LiFe_xMn_{1-x}PO_4$ nevertheless retains the good thermal stability of $LiFePO_4$.

The mandrel was chosen to be of steel to ensure a comfortable stress margin for stress to ensure stem breakage only occurs at abutment against the nosepiece of the riveting tool and not before. A standard pneumatic rivet setting gun was used. Of course, other types of riveting tool could also be appropriate.

The following sealing tests consisted in checking for helium leakage using a mass spectrometer. The helium leak rate was tested at 20° C. and at ambient pressure. In each case and as shown in the table below, for 10 covers, helium leak rate proved to be less than $1.10^{-7}$ atm·cm$^3$/s.

| Sample No. | Helium Leak rate (atm · cm$^3$/s) |
|---|---|
| Sample 1 | 2.4E−08 |
| Sample 2 | 2.8E−08 |
| Sample 3 | 2.8E−08 |
| Sample 4 | 3.1E−08 |
| Sample 5 | 3.5E−08 |
| Sample 6 | 7.0E−08 |
| Sample 7 | 8.5E−08 |
| Sample 8 | 8.7E−08 |
| Sample 9 | 2.5E−08 |
| Sample 10 | 3.7E−08 |

In view of these results, it is seen that the invention makes it possible to reliably seal off the filling orifices of containers.

The method according to the invention is advantageously simplified by the fact that it requires only one single part in other words a stopper arrangement made of a mandrel received in a tubular member. It is indeed not necessary to add washers and other sealing elements. By sealing element we mean providing any additional element to ensure the sealing function.

The method of the invention also has the advantage of being able to be implemented at particularly low container wall thicknesses, i.e. which can be of the order of 1 mm.

The invention claimed is:

1. A method for sealing in a leak-proof manner a filling orifice formed on a wall of a container using a stopper arrangement, said stopper arrangement comprising:
a tubular member, said tubular member being provided at one of its ends with a flange having an upper face adapted to receive a nosepiece of a riveting tool and a lower face adapted to cover the orifice, and a mandrel provided with a stem terminating with a head, the stem being housed inside the tubular member and the head being located at one end of the mandrel, opposite the flange, said mandrel head having a cross section that is comprised between the inside cross section and the outer cross section of the tubular member, the material constituting the stem having a hardness that is equal to or greater than three times the hardness of the material constituting the tubular member and the material constituting the container wall having a hardness greater than or equal to 1.3 times that of the tubular member, said method comprising the steps of:

introducing the stopper arrangement into the orifice, the cross section of the orifice being greater than the outer cross section of the tubular member so as to intentionally define a gap between the wall of the orifice and the outer wall of the tubular member, bringing the nosepiece of the riveting tool into abutment with the upper face of the flange of the stopper arrangement, actuating the riveting tool so as to exert a tensile force on the stem of the mandrel, the nosepiece of the riveting tool maintaining the tubular member in the orifice, to thereby:

bring about expansion of the tubular member against the wall of the orifice by the entrance and advance of the head of the mandrel inside the tubular member and, close the gap between the wall of the orifice and the outer wall of the tubular member by the advance and maintenance of the head of the mandrel inside the tubular member at the wall of the container.

2. The method for sealing a filling orifice in a leak-proof manner according to claim 1, comprising an additional step of rupturing the stem of the stopper arrangement, after having at least positioned the nosepiece of the riveting tool in abutment with the upper face of the flange of the stopper arrangement, the force necessary for rupturing the stem being greater than the force resulting from the entry and advancement of the head of the mandrel inside the tubular member and the cross section of the riveting tool being smaller than the cross section of the mandrel head.

3. The method for sealing a filling orifice in a leak-proof manner according to claim 1, wherein the gap prior to expansion of the tubular member corresponds to a difference between the diameter of the orifice and the outside diameter of the tubular member, this being greater than 0.05 mm.

4. The method for sealing a filling orifice in a leak-proof manner according to claim 1, wherein the stem comprises a region of weakness of smaller cross section than the average cross section of the stem, so that the rupture of the stem occurs at said weakened region for tensile forces less than $R_{m41}*s41'$ in which:

s41' corresponds to the cross section of the stem after fracture under tensile stress, $R_{m41}$ is the ultimate tensile strength of the stem.

5. The method for sealing a filling orifice in a leak-proof manner according to claim 1, wherein the stem is made of steel.

6. The method for sealing a filling orifice in a leak-proof manner according to claim 1, wherein the tubular member is of aluminum alloy.

7. The method for sealing a filling orifice in a leak-proof manner according to claim 1, wherein the tubular member is sealed at its end opposite the flange by a cover.

8. The method for sealing a filling orifice in a leak-proof manner according to claim 1, wherein the head of the mandrel extends along a length comprised between 80% and 150% of the sum of the thickness of the container wall and the thickness of the flange.

9. The method for sealing a filling orifice in a leak-proof manner according to claim 1, wherein the face of the nosepiece of the riveting tool and the surface of the flange of the stopper arrangement are planar.

10. The method for sealing a filling orifice in a leak-proof manner according to claim 1, wherein the face of the nosepiece of the riveting tool comprises a projection of a shape that is complementary to that of a recess formed on the upper face of the flange of the stopper arrangement.

11. The method for sealing a filling orifice in a leak-proof manner according to claim 1, wherein the container wall has a thickness of between 1 and 3 mm.

12. The method for sealing a filling orifice in a leak-proof manner according to claim 1, wherein the container is of aluminum.

13. The method for sealing a filling orifice in a leak-proof manner according to claim 1, wherein the cross sections of respectively the tubular member, of the stem, of the head of the mandrel and of the orifice are elliptical.

14. The method for sealing a filling orifice in a leak-proof manner according to claim 12, wherein the cross sections of respectively the tubular member, of the stem, of the head, of the mandrel and of the orifice are circular.

15. The method for sealing a filling orifice in a leak-proof manner according to claim 14, wherein the diameter of the orifice is between 3.25 and 3.7 mm.

16. The method for sealing a filling orifice in a leak-proof manner according to claim 1, wherein the wall of the container is a cover of a storage cell container, the filling orifice being an electrolyte filling orifice.

17. The method for sealing a filling orifice in a leak-proof manner according to claim 16, wherein the storage cell is a lithium-ion type cell.

18. The method for sealing a filling orifice in a leak-proof manner according to claim 1, wherein the stopper arrangement and the container satisfy the following relationships:

$$s_{41} < s_{30int} < s_{42} < s_{30ext} < s_{12}$$

$$s_{42} - s_{41} > s_{12} - s_{30ext}$$

$$R_{m41}*s_{41'} > 7*R_{m30}*e*(s_{42}-s_{41}+s_{30ext}-s_{12})/2 + 0.9 R_{m30}*(s_{30ext}-s_{41})$$

in which:

$s_{41}$, $s_{41'}$, $s_{30int}$, $s_{42}$, $s_{30ext}$, $s_{12}$ are respectively the cross sections of the stem prior to and after fracture under tensile stress of the tubular member (inside cross section), of the mandrel head, of the tubular member (outside cross section) and of the orifice, e: thickness of the container $R_{m30}$ and $R_{m41}$: ultimate tensile strengths.

19. The method for sealing a filling orifice in a leak-proof manner according to claim 1, wherein the stopper arrangement is made up solely of the tubular member and the mandrel.

20. A container for a storage cell provided with a cell electrolyte filling orifice, wherein the filling orifice is closed in a leak-proof manner vis-a-vis liquids and gases by means of a method according to claim 1.

* * * * *